I. M. FRY.
Picket-Pins for Horses, &c.
No. 147,928. Patented Feb. 24, 1874.
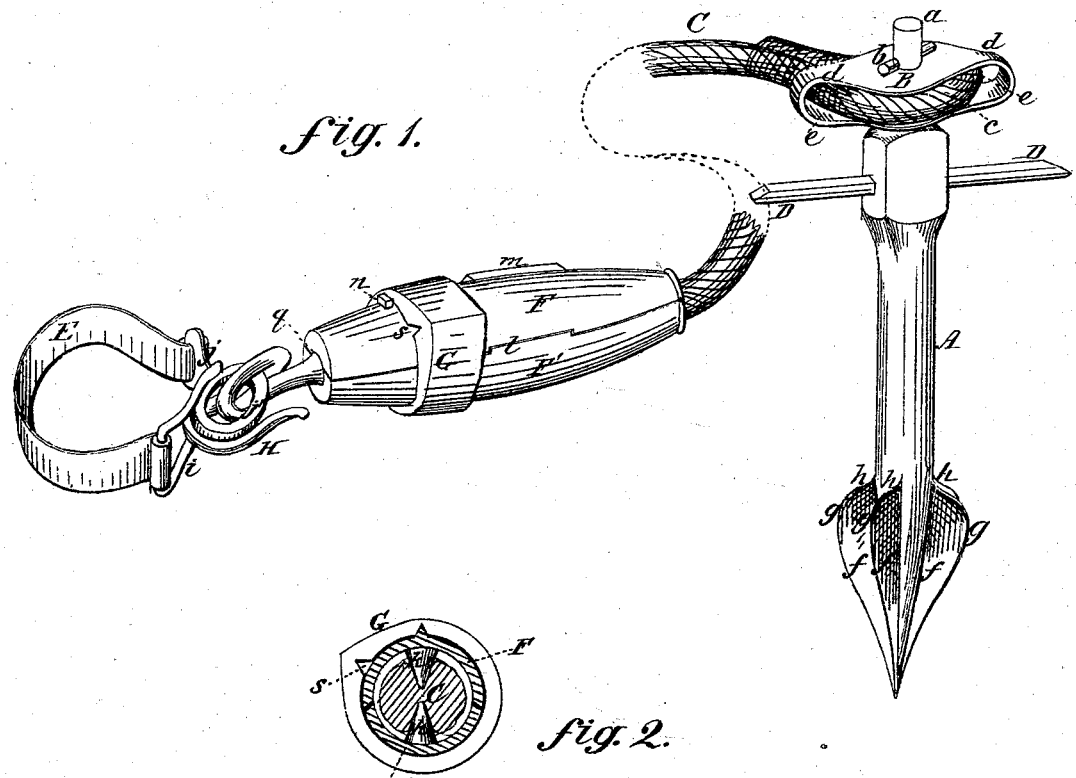
fig. 1.
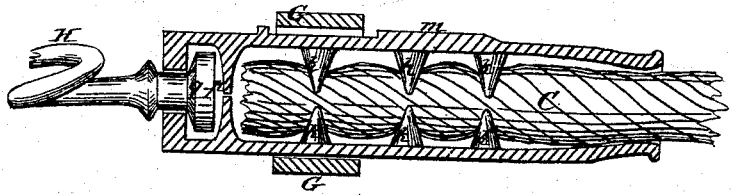
fig. 2.
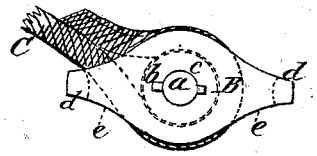
fig. 3.
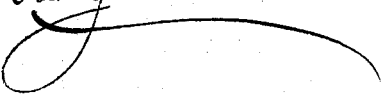
Attest:
J. A. Rutherford
Harry Coleman
Inventor:
Isaac M. Fry,
per Johnson and Johnson
his Attorneys.

UNITED STATES PATENT OFFICE.

ISAAC M. FRY, OF EMPIRE PRAIRIE, MISSOURI.

IMPROVEMENT IN PICKET-PINS FOR HORSES, &c.

Specification forming part of Letters Patent No. 147,928, dated February 24, 1874; application filed December 10, 1873.

*To all whom it may concern:*

Be it known that I, ISAAC M. FRY, of Empire Prairie, in the county of Andrew and State of Missouri, have invented certain new and useful Improvements in Picket-Pins for Horses and Cattle, of which the following is a specification:

My invention relates to devices for staking out horses and cattle for grazing and keeping the tie-rope free from winding around the stake, or twisting into knots by the movements of the animal; and my improvements therein consist of a picket-pin having a swiveling sheave-head block for the rope, and with band-hold arms, whereby to confine the rope within the head, prevent its being cut out by acting as stops, and serve as the means for withdrawing the pin from the ground, when required; also, in a peculiar winged construction of the pin-point, which, while allowing the free entrance of the pin into the ground, serves to prevent it from being pulled out of the ground by the animal; the said wings, being radial, and rising from a sharp point into swells, join the pin in short curves, which act as so many arms, holding the pin down, while permitting its ready withdrawal by a direct upward pull; also, in the combination, with the picket-pin, of a rope-dog, its swiveling hook, and a foot-cuff, whereby the latter and the tie-rope are united by a swiveling connection, and the twisting of the rope by the movements of the animal is prevented; also, of a rope-dog, made in sections, with biting-teeth, and a clasp-ring, to secure both the tie-rope and the swiveling hook in their sockets, and admit of their ready separation; in a peculiar labyrinth-hook, for connecting the foot-cuff, and the construction of the latter with interlocking hinged loops, one of which only forms the connection with the swiveling rope-dog hook.

In the accompanying drawings, Figure 1 represents a view in perspective of the picket-pin and the foot-cuff as connected by the rope-dog when in use; Fig. 2, sectional views of the rope-dog, and Fig. 3 a top view of the swiveling pin-head.

The upper end of the pin A is formed into a short cylindrical stem, $a$, to receive a sheave-head block, B, which is held in place by a pin, $b$, so that it is free to turn in the stem. The hub $c$ of the head-block is like a sheave, with two opposite arms, $d\ d$, which form eyes $e\ e$ to the hub, round which the rope C is tied; and the arms $d\ d$ serve as stops, to keep the rope from turning on the hub, and the latter is thereby caused to turn upon its stem $a$ either way the rope should be moved against the arms $d$. This saves the rope from being cut out. The point of the pin is provided with radial wings $f$, forming a sharp point, with the upper portion of each wing swelling outward at $g$, and abruptly joining the body of the pin at $h$, making a web of stays, with their upper short curves holding the pin down when driven into the earth, and yet allow it to be readily pulled up by the hands. As the sheave-block B is swiveled, there will, of course, be no turning of the pin A in the ground, but the carrying-block turns, and the rope becomes a fixed point by the arms $d$, which also form hand-holds, by which to withdraw the pin, and affording a central purchase or lift, without endangering the breaking of the pivot-stem.

The pin is driven into the ground to the arm D. The rope C is connected to the foot-cuff E, which is of metal, with a loop, $i$, and an eyed arm, $j$, hinged to it, so as to be interlocked to close the cuff, with the eye $j'$ outside, to make the connection with the pin rope-hook. The interlocking branches $i$ and $j$ open and close with each other in using the cuff. A metallic dog, F, unites the pin with the foot-cuff by means of the swivel-hook. This dog is made in two sections, F F', hollow, and open at one end to receive and clamp the end of the tie-rope between them by teeth $k$, which bite into the rope. The sections are lapped together by lips $l$; and, when the rope is inserted, the sections are clamped together by a clasp-ring, G, shoved over the sections, and held in place by a rib, $m$, and stop $n$, the clasp having a groove, $s$, to allow it to be passed over the rib $m$, and, by turning the clasp slightly, locks it between the rib and the stop. The other end of the dog is closed to form a socket, $p$, to receive a button head, $q$, on the cylindrical shank of a hook, H, so that the latter is free to swivel within the end of the dog, which, in connection with the swiveling sheave-head block B, prevents the rope C from becoming twisted and curled into knots by the stepping of the animal over the rope. The dog thus forms a combined rope-holder and swivel-hook for the foot-cuff, which relieves all binding of the cuff upon the foot, while the draft of the cuff is always upon its smooth part, so that its hinged branches can have no abrading action upon the limb. The hook H is formed by twisting it so as to make a labyrinth way for the eye-branch $j'$ of the cuff, and, in effect, form a closed hook, which may be hooked and unhooked, but cannot become unfastened by the movements of the animal.

The combined dog and swivel-hook may be attached to a neck-tie, $h$, and will make a safe fastening.

I claim—

1. The swiveling sheave-head block B for the tie-rope C, and its arms $d\ d$, in combination with the picket-pin A, substantially as described, whereby the arms serve as stops to prevent the cutting out of the rope, and as hand-holds to withdraw the pin.

2. The point of the pin provided with wings $f\ g$, constructed as described, to prevent the withdrawal of the pin by the animal.

3. The combination of the pin A with the rope-dog F, a swiveling hook, H, and a foot-cuff, E, substantially as and for the purpose described.

4. The sectional rope-dog F, provided with a grooved clasping-band, G, for interlocking with the rib $m$, and the stop $n$, to clamp and hold both the tie-rope and the swiveling hook, as described.

5. The swiveling labyrinth-hook H, for picket-pin ties, in combination with the rope-dog F, as described.

6. The picket-pin foot-cuff E, provided with intermatching hinged looped arm $i\ j$, as described, to prevent binding the limb, and bring the draft upon the smooth part of the cuff.

In testimony whereof I have hereunto set my hand in the presence of two subscribing witnesses.

ISAAC M. FRY.

Witnesses:
   D. BONHAM, Jr.,
   J. G. WOODWARD.